United States Patent
Shu et al.

(10) Patent No.: US 10,971,141 B2
(45) Date of Patent: Apr. 6, 2021

(54) SESSION INFORMATION PROCESSING METHOD AND DEVICE AND STORAGE MEDIUM

(71) Applicant: Tencent Technology (Shenzhen) Company Limited, Shenzhen (CN)

(72) Inventors: Yue Shu, Shenzhen (CN); Fen Lin, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 50 days.

(21) Appl. No.: 16/670,822

(22) Filed: Oct. 31, 2019

(65) Prior Publication Data
US 2020/0066262 A1 Feb. 27, 2020

Related U.S. Application Data

(63) Continuation of application No. PCT/CN2017/107269, filed on Oct. 23, 2017.

(51) Int. Cl.
*G06F 40/30* (2020.01)
*G10L 15/197* (2013.01)
(Continued)

(52) U.S. Cl.
CPC .......... *G10L 15/197* (2013.01); *G06F 40/30* (2020.01); *G10L 15/05* (2013.01); *G10L 15/1822* (2013.01); *G10L 19/135* (2013.01)

(58) Field of Classification Search
CPC ..... G06F 3/0482; G06F 40/30; G10L 15/197; G10L 15/05; G10L 15/1822;
(Continued)

(56) References Cited

U.S. PATENT DOCUMENTS 8,713,418 B2* 4/2014 King .................. G06F 16/93
715/200
8,892,488 B2* 11/2014 Qi .................... G06F 40/30
706/45
(Continued)

FOREIGN PATENT DOCUMENTS

CN 104598445 A 5/2015
CN 105701088 A 6/2016
(Continued)

OTHER PUBLICATIONS

Tencent Technology, ISRWO, PCT/CN2017/107269, Jan. 31, 2018, 5 pgs.
(Continued)

*Primary Examiner* — Vijay B Chawan
(74) *Attorney, Agent, or Firm* — Morgan, Lewis & Bockius LLP

(57) ABSTRACT

This application discloses a session information processing method and device, and a storage medium. The method includes: extracting a to-be-analyzed sentence and preceding sentences of the to-be-analyzed sentence from a session; performing word segmentation on the to-be-analyzed sentence and the preceding sentences, to obtain a first feature set including a plurality of first features; extracting a second feature set including one or more second features from a first word set corresponding to the to-be-analyzed sentence and a second word set corresponding to the preceding sentences, one second feature including a phrase or sentence including a first word and a second word, the first word being one or more words in the first word set, and the second word being one or more words in the second word set; and determining, according to the first feature set and the second feature set, a sentence category to which the to-be-analyzed sentence belongs.

20 Claims, 8 Drawing Sheets

(51) Int. Cl.
  *G10L 15/05* (2013.01)
  *G10L 15/18* (2013.01)
  *G10L 19/135* (2013.01)

(58) Field of Classification Search
  CPC ....... G10L 19/135; H04L 51/02; H04L 51/04;
  H04L 51/046; H04L 51/063; H04L 51/10;
  H04L 65/1069; H04L 65/1093; H04L
  65/403; H04L 65/60; H04L 65/602; H04L
  67/10; H04L 67/36; H04L 67/42
  USPC ............. 704/257, 270.1, 270, 275, 255, 251
  See application file for complete search history.

(56) References Cited

U.S. PATENT DOCUMENTS

| | | | | |
|---|---|---|---|---|
| 10,672,383 | B1* | 6/2020 | Thomson | G10L 15/183 |
| 10,791,176 | B2* | 9/2020 | Phipps | G10L 15/22 |
| 10,880,243 | B2* | 12/2020 | Rodriguez | H04L 51/046 |
| 2005/0043940 | A1* | 2/2005 | Elder | G06F 16/24522 |
| | | | | 704/9 |
| 2012/0310627 | A1* | 12/2012 | Qi | G06F 40/30 |
| | | | | 704/9 |
| 2018/0096203 | A1* | 4/2018 | King | G06F 40/166 |
| 2018/0367484 | A1* | 12/2018 | Rodriguez | H04L 67/36 |
| 2019/0297039 | A1* | 9/2019 | Rodriguez | G06Q 10/101 |
| 2019/0374147 | A1* | 12/2019 | Hoan | A61B 5/6866 |

FOREIGN PATENT DOCUMENTS

| | | | | |
|---|---|---|---|---|
| CN | 106547735 | A | | 3/2017 |
| CN | 106997342 | A * | 8/2017 | G06F 40/30 |
| CN | 106997342 | A | | 8/2017 |
| CN | 107133345 | A | | 9/2017 |

OTHER PUBLICATIONS

Tencent Technology, IPRP, PCT/CN2017/107269, Apr. 28, 2020, 4 pgs.

Starzhou, "20 Tips and Tricks to Overcome Overfitting and Improve Generalization Ability", Oct. 8, 2016, retrieved from the Internet: https://blog.csdn.net/starzhou/article/details/52754436.

* cited by examiner

SESSION INFORMATION PROCESSING METHOD AND DEVICE AND STORAGE MEDIUM

CROSS-REFERENCE TO RELATED APPLICATIONS

This application is a continuation application of PCT/CN2017/107269, entitled "SESSION INFORMATION PROCESSING METHOD AND DEVICE, AND STORAGE MEDIUM" filed on Oct. 23, 2017, which is incorporated by reference in its entirety.

FIELD OF THE TECHNOLOGY

This application relates to the field of artificial intelligence technologies, and in particular, to a session information processing method and device, and a storage medium.

BACKGROUND OF THE DISCLOSURE

An artificial intelligence (AI) technology is a technology of simulating human's thoughts and behaviors by using a modernization tool such as a computer. With the daily progress of the artificial intelligence technology, the artificial intelligence technology has been applied to various aspects in production and life, such as a dialog system. In the dialog system, an AI dialog robot performs semantic analysis on sentences in a dialog and then makes a corresponding response.

SUMMARY

Embodiments of this application provide a session information processing method and device, and a storage medium.

According to a first aspect of this application, the session information processing method is performed at a computing device having one or more processors and memory storing programs to be executed by the one or more processors, the method comprising:

extracting a to-be-analyzed sentence and a preset quantity of preceding sentences of the to-be-analyzed sentence from a session;

performing word segmentation on the to-be-analyzed sentence and the preset quantity of preceding sentences, to obtain a first feature set including a plurality of first features;

extracting a second feature set including one or more second features from a first word set corresponding to the to-be-analyzed sentence and a second word set corresponding to the preset quantity of preceding sentences, one second feature including a phrase or sentence including a first word and a second word, the first word being one or more words in the first word set, and the second word being one or more words in the second word set; and determining, according to the first feature set and the second feature set, a sentence category to which the to-be-analyzed sentence belongs, the sentence category including a first category indicating that a sentence is complete, and semantics is unambiguous and a second category indicating that a sentences is incomplete, or semantics is ambiguous.

The session information processing method provided in an embodiment of this application includes:

receiving a sentence in a session and using the sentence as a to-be-analyzed sentence;

determining a category of the to-be-analyzed sentence by using the method;

analyzing semantics of the to-be-analyzed sentence according to the to-be-analyzed sentence in a case that the to-be-analyzed sentence belongs to the first category, to obtain the semantics of the to-be-analyzed sentence;

analyzing the semantics of the to-be-analyzed sentence according to the to-be-analyzed sentence and the preset quantity of preceding sentences in a case that the to-be-analyzed sentence belongs to the second category, to obtain the semantics of the to-be-analyzed sentence; and performing a corresponding operation according to the semantics of the to-be-analyzed sentence.

In some embodiments, the analyzing the semantics of the to-be-analyzed sentence according to the to-be-analyzed sentence and the preset quantity of preceding sentences in a case that the to-be-analyzed sentence belongs to the second category, to obtain the semantics of the to-be-analyzed sentence includes:

completing the to-be-analyzed sentence according to the preceding sentences, to obtain a completed sentence, the completed sentence belonging to the first category, and performing semantic analysis on the completed sentence, to obtain the semantics of the to-be-analyzed sentence.

In some embodiments, the completing the to-be-analyzed sentence according to the preceding sentences includes:

determining a completed sentence corresponding to the to-be-analyzed sentence by using a mapping model, the mapping model being pre-constructed by using an auto-encoder, input information of the mapping model being the to-be-analyzed sentence and the preceding sentences, and output information of the mapping model being the completed sentence.

In some embodiments, the performing a corresponding operation according to the semantics of the to-be-analyzed sentence includes:

setting a corresponding slot by using a slot system and according to the semantics of the to-be-analyzed sentence, replying a user with an information obtaining sentence for the to-be-analyzed sentence, to obtain information needed by the slot, and performing the corresponding operation according to the information needed by the slot.

The session information processing method provided in an embodiment of this application is performed by an electronic device and includes:

extracting a to-be-analyzed sentence and a preset quantity of preceding sentences of the to-be-analyzed sentence from a session;

performing word segmentation on the to-be-analyzed sentence and the preset quantity of preceding sentences, to obtain a first feature set including a plurality of first features;

extracting a second feature set including one or more second features from a first word set corresponding to the to-be-analyzed sentence and a second word set corresponding to the preset quantity of preceding sentences, one second feature including a phrase or sentence including a first word and a second word, the first word being one or more words in the first word set, and the second word being one or more words in the second word set; and determining, according to the first feature set and the second feature set, a sentence category to which the to-be-analyzed sentence belongs, the sentence category including a first category indicating that a sentence is complete, and semantics is unambiguous and a second category indicating that a sentences is incomplete, or semantics is ambiguous.

The session information processing method provided in an embodiment of this application is performed by an electronic device and includes:

receiving a sentence in a session and using the sentence as a to-be-analyzed sentence;

determining a category of the to-be-analyzed sentence by using the method;

analyzing semantics of the to-be-analyzed sentence according to the to-be-analyzed sentence in a case that the to-be-analyzed sentence belongs to the first category, to obtain the semantics of the to-be-analyzed sentence;

analyzing the semantics of the to-be-analyzed sentence according to the to-be-analyzed sentence and the preset quantity of preceding sentences in a case that the to-be-analyzed sentence belongs to the second category, to obtain the semantics of the to-be-analyzed sentence; and performing a corresponding operation according to the semantics of the to-be-analyzed sentence.

According to a second aspect of this application, a computing device includes one or more processors, memory coupled to the one or more processors and a plurality of programs stored in the memory that, when executed by the one or more processors, cause the computing device to perform the aforementioned session information processing method.

According to a third aspect of this application, a non-transitory computer readable storage medium stores a plurality of machine readable instructions in connection with a computing device having one or more processors. The plurality of machine readable instructions, when executed by the one or more processors, cause the computing device to perform the aforementioned session information processing method.

BRIEF DESCRIPTION OF THE DRAWINGS

The accompanying drawings described herein are used to provide further understanding about this application, and form a portion of this application. Schematic embodiments of this application and descriptions about the exemplary embodiments are used to construe this application, and do not constitute an inappropriate limitation on this application. In the figures.

DESCRIPTION OF EMBODIMENTS

Figure 1:
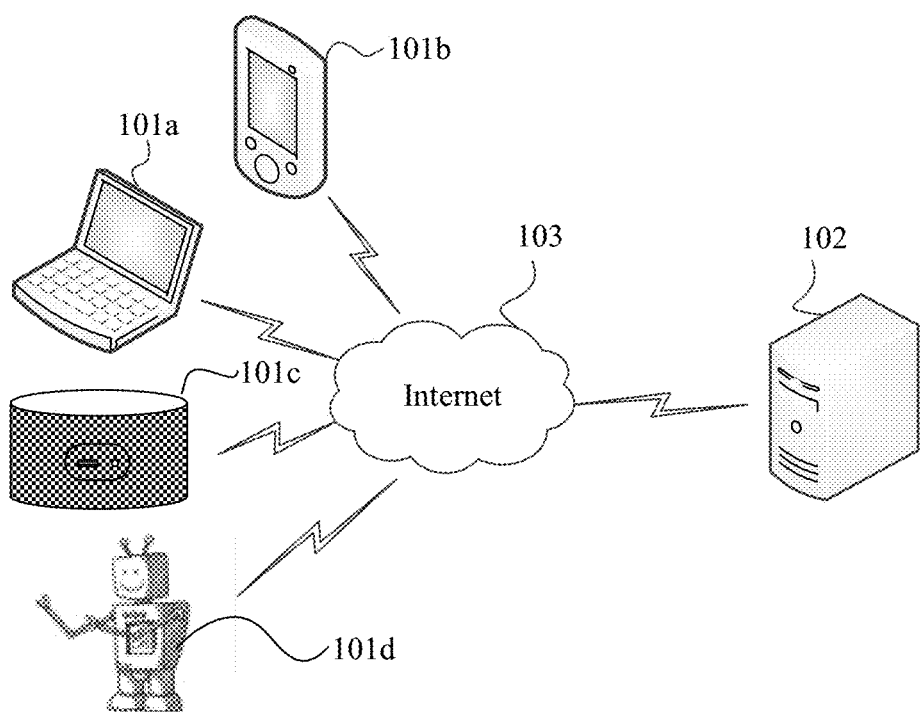
FIG. 1 is a diagram of a system architecture according to an embodiment of this application.

This application provides a session information processing method. A system architecture to which the method is applicable is shown in FIG. 1. The system architecture includes a client device (such as 101a to 101d in FIG. 1) and a server 102. The client device is connected to the server 102 by using a communications network 103.

The client device may be a computer 101a or a smartphone 101b of a user, and client software of various application software is installed on the client device. The user may log in to and use clients of various application software through the client device. The clients of the application software may include a shopping client having an artificial intelligence function, such as Tmall (an artificial intelligence tool-Ali secretary) and Jingdong (an intelligent customer service-a JIMI intelligent robot). The clients of the application software may also include a social client, such as WeChat (an official account of Xian'er machine monk). Certainly, the clients of the application software may also be another client providing an artificial intelligence service. The clients may be a hardware device such as a smart speaker 101c (such as Tichome that can query air tickets/take-aways, Tmall genie that supports shopping and placing an order via voice, and Xiaomi AI speaker that can query weather) and an intelligent robot 101d (such as Xian'er machine monk) in addition to a device such as a smartphone and a computer.

The server 102 may be a server or may be a server cluster, corresponds to a client installed on the client device, and may provide a corresponding service to the client device.

The communications network 103 may be a local area network (LAN), a metropolitan area network (MAN), a wide area network (WAN), a mobile network, a wired network or a wireless network, a dedicated network, or the like.

When the user uses the client device, the client device can exchange data with the server 102 by using the communications network 103. The server 102 performs a session information processing method provided in the embodiments of this application, so that the user enjoys an online artificial intelligence service. That is, when the client device is in a state of being connected to a network, the client device may provide an online artificial intelligence service to the user. Certainly, the session information processing method provided in the embodiments of this application may be performed by the server in the foregoing scenario or may be performed by a hardware device that directly faces the user and that can provide an artificial intelligence service in an offline state. Herein, a background server that can perform the session information processing method provided in the embodiments of this application or the hardware device that directly faces the user and that can provide an artificial intelligence service in an offline state may be collectively referred to as an electronic device.

Figure 2:
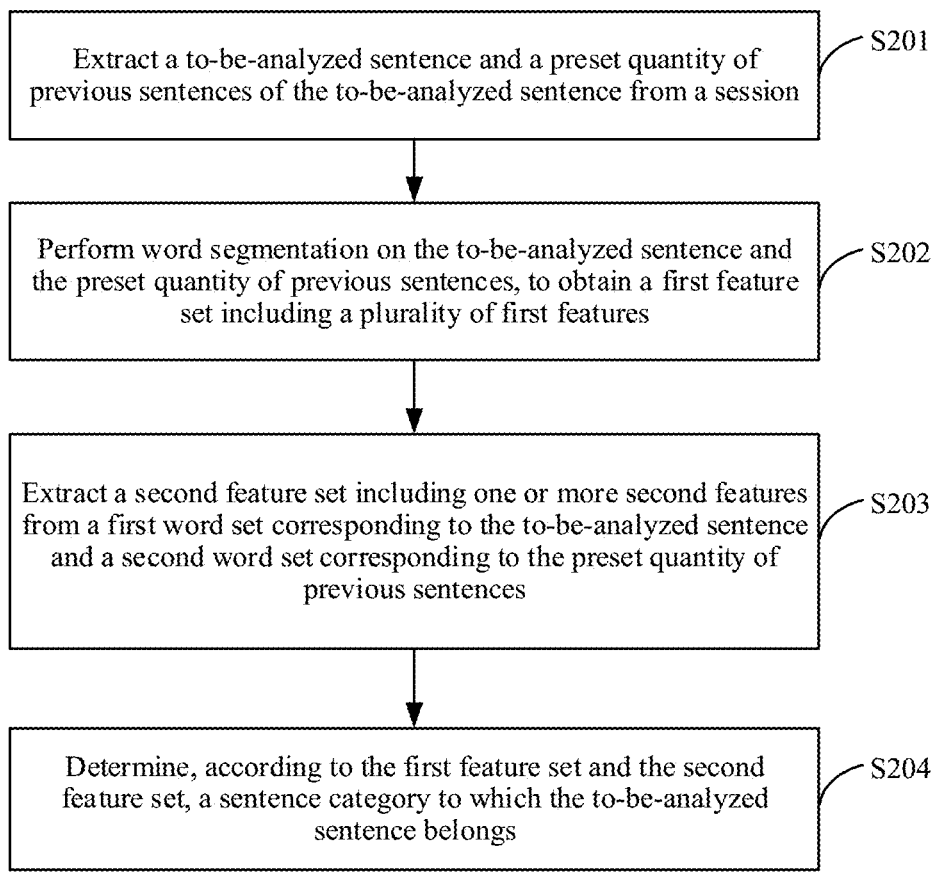
FIG. 2 is a schematic flowchart of a session information processing method according to an embodiment of this application.

An embodiment of this application provides a session information processing method. The method may be performed by the electronic device. As shown in FIG. 2, the method specifically includes:

S201: Extract a to-be-analyzed sentence and a preset quantity of preceding sentences of the to-be-analyzed sentence from a session.

It may be understood that the preceding sentences are sentences previous to the to-be-analyzed sentence in a session. To better understand the to-be-analyzed sentence, several preceding sentences adjacent to the to-be-analyzed sentence may be selected. The preset quantity may be selected according to needs, and is, for example, 2.

For example, the following several sentences are included in a dialog:

A: 白马寺 (white horse temple)
B: 很悠久的寺院 (a temple of a long history)
A: 去过吗 (Have you visited?)

"去过吗？" is a to-be-analyzed sentence, and the former two sentences "白马寺" and "很悠久的寺院" may be selected as preceding sentences.

S202: Perform word segmentation on the to-be-analyzed sentence and the preset quantity of preceding sentences, to obtain a first feature set including a plurality of first features.

It may be understood that an objective of performing word segmentation on the to-be-analyzed sentence and the preceding sentences is to obtain the first features of the to-be-analyzed sentence and the preceding sentences.

There is a plurality of manners of performing word segmentation on the to-be-analyzed sentence and the preceding sentences. For example, word segmentation may be performed by using an N-gram algorithm, and obtained words may be referred to as N-gram features. A specific word segmentation process includes: splicing the to-be-analyzed sentence and the preset quantity of preceding sentences according to a sentence sequence in the session, to obtain a spliced sentence, adjacent preceding sentences being separated by using a first character, and the to-be-analyzed sentence and a previous sentence adjacent to the to-be-analyzed sentence being separated by using a second character; and extracting an N-gram feature from the spliced sentence and using the N-gram feature as the first feature to form the first feature set, N being a preset integer.

For example, N is 3, the first character is _EOS_, and the second character is END, so that which sentences are preceding sentences and which sentences are to-be-analyzed sentences are distinguished. A spliced sentence obtained by splicing the session provided in step S201 is "白马寺 _EOS_ 很悠久的寺院 _END_ 去过吗". Then, word segmentation is performed on the spliced sentence to obtain:

1_gram: {白，马，寺，_EOS_，很，悠，久，的，寺，院，_END_，去，过，吗};

2_gram: {白马，马寺，寺_EOS_，_EOS_很，很悠，悠久，久的，的寺，寺院，院_END_，_END_去，去过，过吗};

3_gram: {白马寺，马寺_EOS_，寺_EOS_很，_EOS_很悠，很悠久，悠久的，久的寺，的寺院，寺院_END_，院_END_去，_END_去过，去过吗};

Each feature in 1_gram, 2_gram, and 3_gram is referred to as the N-gram feature, and 1_gram, 2_gram, and 3_gram form the first feature set.

Because there are many first features in the first feature set, the first features may be numbered by using natural numbers, such as "白1" and "马2", to distinguish different first features.

S203: a second feature set including one or more second features from a first word set corresponding to the to-be-analyzed sentence and a second word set corresponding to the preset quantity of preceding sentences, one second feature including a phrase or sentence including a first word and a second word, the first word being one or more words in the first word set, and the second word being one or more words in the second word set.

It may be understood that step S203 is actually a process of extracting the second feature. Each second feature includes one or more words in the first word set and also includes one or more words in the second word set. That is, the second feature includes words in the to-be-analyzed sentence and also includes words in the preceding sentences. Therefore, the second feature may be referred to as a cross feature. A meaning of the step lies in that a semantic fragment that has a meaning may be extracted.

For a process of forming the first word set and the second word set, refer to a process of forming the first feature set. The process of forming the first word set and the second word set is specifically: word segmentation is performed on the to-be-analyzed sentence by using an N-gram algorithm, to obtain N-gram features (these N-gram features may be referred to as first words), and these N-gram features form the first word set; similarly, word segmentation may also be performed on the preceding sentences in preset quantity of preceding sentences by using the N-gram algorithm, to obtain N-gram features (these N-gram features may be referred to as second words), and the N-gram features obtained by performing word segmentation on the preset quantity of preceding sentences form the second word set.

For example, for the session provided in step S201, the extracted second features may include: 去过_白马寺，去过_悠久，and 去过_寺院, and these second features form the second feature set.

S204: Determine, according to the first feature set and the second feature set, a sentence category to which the to-be-analyzed sentence belongs, the sentence category including a first category indicating that a sentence is complete, and semantics is unambiguous and a second category indicating that a sentences is incomplete, or semantics is ambiguous.

It may be understood that the first category means that a sentence is complete and semantics is unambiguous.

For example,

A1: 白马寺
B1: 很悠久的寺院
A1: 去过白马寺吗

For a to-be-analyzed sentence "去过白马寺吗？", the sentence is complete, and semantics is unambiguous. Therefore, the to-be-analyzed sentence belongs to the first category.

The second category means that a sentence is incomplete or semantics is ambiguous.

For example,

A2: 白马寺
B2: 很悠久的寺院
A2: 去过吗

For a to-be-analyzed sentence "去过吗？", the sentence is incomplete, and analysis needs to be performed by combining preceding sentences when a meaning of the sentence is to be understood. Therefore, the to-be-analyzed sentence belongs to the first category.

Certainly, sentence categories do not include only the foregoing two categories, and for example, further include a third category. A sentence of the category indicates that a session ends.

For example,

A3: I would like to go to bed.
B3: Have a good rest.
A3: Good night.

For a to-be-analyzed sentence "good night", the sentence belongs to the third category.

In a session system, when semantic analysis is performed, sentences need to be classified first, and then semantic analysis is performed on sentences of different categories by using different manners. For example, a sentence of the first category does not need to intend to be inherited provided with the sentence is analyzed according to the to-be-analyzed sentence. A sentence of the second category needs to intend to be inherited, that is, the to-be-analyzed sentence needs to be analyzed by combining the preceding sentences. For a sentence of the third category, semantic analysis may not be performed.

There is a plurality of manners of determining the sentence category to which the to-be-analyzed sentence belongs in step S204. One manner includes the following process:

S2041: Encode each feature in the first feature set and the second feature set, to obtain a first vector corresponding to the feature, a quantity of elements in each first vector being the same.

It may be understood that step S2041 is actually a process of feature vectorization, and a feature is converted into a vector, to facilitate subsequent calculation steps. One feature is encoded to obtain a first vector, and a length of each first vector (that is, a quantity of elements) is the same. In addition, it may be preset according to needs that for example, each feature is encoded into a first vector whose vector length is 100 dimensions. The "100 dimensions" means that the first vector includes 100 elements. In actual application, a word embedding matrix may be specifically used to convert each first feature or second feature into a first vector having a fixed length.

S2042: Determine a second vector according to the first vectors, the second vector being a vector representing the to-be-analyzed sentence and the preset quantity of preceding sentences.

Because some first vectors are obtained by encoding the to-be-analyzed sentence, and some first vectors are obtained by encoding the preceding sentences, while the second vector is determined according to the first features, the second vector may represent the to-be-analyzed sentence and the preset quantity of preceding sentences. Therefore, the second vector may be referred to as a representation vector of the to-be-analyzed sentence and the preceding sentences.

In actual application, there are many methods for determining the second vector. One method is: determining an average vector of the first vectors and using the average vector as the second vector, each element in the average vector being a ratio of a sum of elements at corresponding locations in the first vectors to a quantity of the first vectors. For example, there are three first vectors, each first vector has two elements, and the three first vectors are (0.3, 0.7), (0.1, 0.9), and (0.4, 0.6). Therefore, the second vector is (0.27, 0.73). If the second vector is calculated by using this manner, a quantity of elements in the second vector is the same as a quantity of elements in the first vectors.

Certainly, a vector averaging method is only a manner of determining the second vector, a long short-term memory (LSTM) network and a convolutional neural network (CNN) may also be used to process the first vectors, to obtain a second vector representing the preceding sentences and the to-be-analyzed sentence. If the second vector is calculated by using the LSTM or CNN, a quantity of elements in the obtained second vector may be the same as a quantity of elements in the first vectors or may be different from a quantity of elements in the first vectors.

S2043: Input the second vector into a preset classifier, to obtain matching degrees between the to-be-analyzed sentence and sentence categories.

The preset classifier may be selected according to needs, and is, for example, a softmax classifier or a support vector machine (SVM). The matching degrees between the to-be-analyzed sentence and the sentence categories may be understood as probabilities at which the to-be-analyzed sentence belongs to the sentence categories.

For example, if a quantity of the second vectors obtained through calculation through the LSTM or CNN is the same as a quantity of the sentence categories, the matching degrees between the to-be-analyzed sentence and the sentence categories may be outputted through the softmax classifier in step S2043. Specifically, the second vector is inputted into a softmax classifier, and the classifier outputs the matching degrees between the to-be-analyzed sentence and the sentence categories by using the following formula (1):

$$\mathit{softmax}(y_0, \ldots, y_n) = \left( \frac{y_0}{\sum_{j=0}^{n} y_j}, \ldots, \frac{y_n}{\sum_{j=0}^{n} y_j} \right), \quad (1)$$

where $y_0, \ldots, y_n$ are elements in the second vector.

It can be known from the formula (1) that a quantity of elements in vectors outputted by the softmax classifier is the same as a quantity of elements in vectors inputted into softmax. Therefore, when the matching degrees between the to-be-analyzed sentence and the sentence categories are determined by using the softmax classifier, a quantity of elements in inputted elements needs to be the same as a quantity of sentence categories. If the matching degrees between the to-be-analyzed sentence and the sentence categories are determined by using another classifier, the quantity of elements in inputted elements does not need to be the same as the quantity of sentence categories.

In actual application, to enhance a generalization capability of the session information processing method in the embodiments of this application and improve a non-linear expression capability of the method, before the second vector is inputted into the preset classifier, nonlinear transformation may be performed on the second vector by using a transformation function, specifically: inputting the second vector into a transformation model, the transformation model including a second preset quantity of transformation functions, nonlinear transformation being capable of being performed on input data by using the transformation functions, and in two adjacent transformation functions, output data of a former transformation function being input data of a latter transformation function in a case that the second preset quantity is greater than or equal to 2. In this way, the output data of the transformation model is inputted into the preset classifier, to obtain the matching degrees between the to-be-analyzed sentence and the sentence categories. In this case, the preset quantity of the preceding sentences may be referred to as a first preset quantity.

It may be understood that because the output data of the former transformation function is the input data of the latter transformation function, the second preset quantity of transformation functions are sequentially connected. The second preset quantity of transformation functions are actually a second preset quantity of hidden layers, and each hidden layer has a transformation function. There is a plurality of transformation functions that can implement nonlinear transformation, such as a sigmoid function.

To further improve a generalization capability, before nonlinear transformation is performed on the input data by using the transformation function, certain linear transformation may also be performed on the input data. For example, an $i^{th}$ transformation function may use the following formula (2):

$$h_i = f_2(W_i * h_{i-1} + b_i) \quad (2), \text{where}$$

$f_2(x_2)=1/(1+\exp(-x_2))$, $x_2=W_i*h_{i-1}+b_i$, $W_i$ is a weight coefficient, $b_i$ is a bias coefficient, $h_{i-1}$ is output data of an $(i-1)^{th}$ transformation function, and $h_0$ is the second vector when i is 1.

In the formula (2), linear transformation is performed on input data $h_{i-1}$ by using $W_i*h_{i-1}+b_i$, and then nonlinear transformation is performed by using $1/(1+\exp(-x_2))$.

It may be understood that if the second vector is inputted into the transformation model, and an outputted vector of the transformation model is inputted into a softmax function represented by the formula (1), $y_0, \ldots, y_n$ are output data of the transformation model.

In actual application, through a plurality of experiments, a generalization capability when the second preset quantity is 2 is better than that when the second preset quantity is 1. If the second preset quantity is greater than 2, a calculation amount is large, and the generalization capability is not greatly improved compared with that when the second preset quantity is 2. Therefore, the second preset quantity may be selected as 2, or certainly, may be set to another value.

In actual application, before a vector (for example, the second vector an outputted vector of the transformation model) to be inputted into the preset classifier is inputted into the preset classifier, the vector is inputted into a full connection layer. The full connection layer functions to convert any length of a vector into a preset length. In this way, the vector to be inputted into the preset classifier may be converted, by using the full connection layer, into a vector whose length is the same as the quantity of sentence categories. For example, the quantity of sentence categories is 3. Therefore, the vector to be inputted into the preset classifier may be converted, by using the full connection layer, into a vector having three elements. In this way, the vector having three elements is then inputted into the preset classifier, implementing classification. Herein, a full connection layer is added, and dimension conversion of the vector is implemented by using a conversion function in the full connection layer, to convert the vector into a vector whose length is the same as the quantity of sentence categories.

S2044: Determine, according to the matching degrees between the to-be-analyzed sentence and the sentence categories, the sentence category to which the to-be-analyzed sentence belongs.

In actual application, a sentence category corresponding to a highest matching degree in the matching degrees between the to-be-analyzed sentence and the sentence categories may be used as the sentence category to which the to-be-analyzed sentence belongs.

For example, a vector outputted by the preset classifier in step S2043 is (0.3, 0.7). A first element in the vector is a matching degree between the to-be-analyzed sentence and the first category, and a second element is a matching degree between the to-be-analyzed sentence and the second category. Because 0.7 is greater than 0.3, the to-be-analyzed sentence belongs to the second category. Certainly, the vector outputted in step S2043 is not limited to having only two elements, and a quantity of elements is consistent with a quantity of categories.

The session information processing method provided in this embodiment of this application is actually a neural network model and is a monitored multi-layer neural network model, and the category to which the to-be-analyzed sentence belongs can be determined. When the to-be-analyzed sentence is classified, the to-be-analyzed sentence is classified according to not only the to-be-analyzed sentence but also the preceding sentences of the to-be-analyzed sentence. Compared with a manner of performing classification according to only the to-be-analyzed sentence, a context information amount is rich, so that classification accuracy can be improved. In addition, in the method, a classification rule does not need to be constructed, to reduce or avoid a problem of a low recall rate caused by incomplete coverage of the classification rule. In summary, the method provided in this embodiment of this application can improve accuracy and the recall rate of determining of the category to which the to-be-analyzed sentence belongs.

In some embodiments, because there is a large quantity of first features in the first feature set formed in step S202, and a larger N value indicates a larger quantity of first features, a certain measure may be used to reduce the quantity of features, and then the first features are encoded into the first vectors. A manner of reducing the quantity of features is: using a hash function, and dispersing massive first features to limited hash buckets through the hash function. Each hash bucket corresponds to a hash value, and first features having a same hash value may be regarded as a feature, to reduce the quantity of features. A specific process may include: inputting each first feature into a preset hash function, to obtain a hash value corresponding to the first feature, the hash function being capable of mapping an input feature to an integer in a preset interval. In this way, when the first features are encoded into the first vectors of preset dimensions, first features having a same hash value may be used as a feature for encoding, to obtain a corresponding first vector. For example, first features "白" and "口了" may be classified, through a hash function, into a hash system numbered 1, to use "白" and "白了" as a feature.

The hash function may use the following formula (3):

$$f_1(x_1)=x_1 \bmod n \qquad (3), \text{where}$$

$x_1$ is an input feature of the hash function, and $f_1(x_1)$ is a hash value and is an integer in [0, n−1].

n in the formula (3) may be selected according to needs. A larger n value indicates more hash buckets. For example, when n=10, the first features may be mapped to integers between 0 and 9. That is, the first features are classified into 10 hash buckets numbered 0 to 9.

Therefore, the foregoing process of mapping the first features to integers in a preset interval by using the hash function is actually a clustering process, and related or similar features are merged into a feature for subsequent processing.

Figure 3:
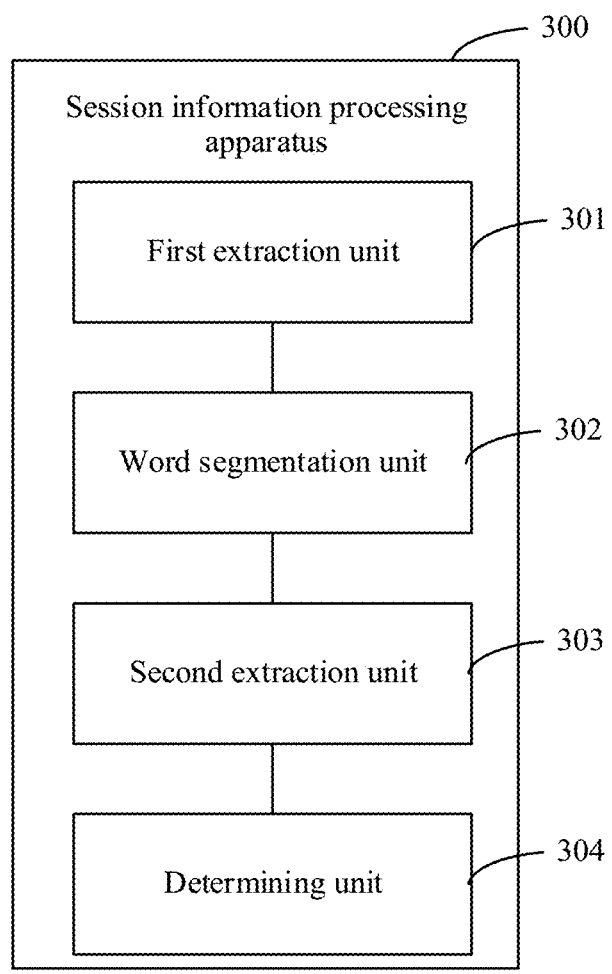
FIG. 3 is a structural block diagram of a session information processing device according to an embodiment of this application.

Corresponding to the foregoing session information processing method, an embodiment of this application further provides a session information processing device. The device may be any electronic device for performing the foregoing session information processing method. As shown in FIG. 3, the device 300 includes:

one or more memories; and
one or more processors,
the one or more memories storing one or more instruction modules, configured to be executed by the one or more processors; and
the one or more instruction units including:
a first extraction unit 301, configured to extract a to-be-analyzed sentence and a preset quantity of preceding sentences of the to-be-analyzed sentence from a session;
a word segmentation unit 302, configured to perform word segmentation on the to-be-analyzed sentence and the preset quantity of preceding sentences, to obtain a first feature set including a plurality of first features;
a second extraction unit 303, configured to extract a second feature set including one or more second features from a first word set corresponding to the to-be-analyzed sentence and a second word set corresponding to the preset quantity of preceding sentences, one second feature including a phrase or sentence including a first word and a second word, the first word being one or more words in the first word set, and the second word being one or more words in the second word set; and a determining unit 304, configured to determine, according to the first feature set and the second feature set, a sentence category to which the to-be-analyzed sentence belongs, the sentence category including a first category indicating that a sentence is complete, and semantics is unambiguous and a second category indicating that a sentences is incomplete, or semantics is ambiguous.

It may be understood that the foregoing units are functional modules of the foregoing session information processing method. For explanations, examples, beneficial effects, and the like of related content thereof, refer to corresponding parts in the foregoing session information processing method. Details are not provided herein again.

In some embodiments, the word segmentation unit may specifically include:

a splicing sub-unit, configured to splice the to-be-analyzed sentence and the preset quantity of preceding sentences according to a sentence sequence in the session, to obtain a spliced sentence, adjacent preceding sentences being separated by using a first character, and the to-be-analyzed sentence and a previous sentence adjacent to the to-be-analyzed sentence being separated by using a second character; and an extraction sub-unit, configured to extract an N-gram feature from the spliced sentence and use the N-gram feature as the first feature to form the first feature set, N being a preset integer.

In some embodiments, the determining unit may include:

an encoding sub-unit, configured to encode each feature in the first feature set and the second feature set, to obtain a first vector corresponding to the feature, a quantity of elements in each first vector being the same;

a first determining sub-unit, configured to determine a second vector according to the first vectors, the second vector being a vector representing the to-be-analyzed sentence and the preset quantity of preceding sentences;

an input sub-unit, configured to input the second vector into a preset classifier, to obtain matching degrees between the to-be-analyzed sentence and sentence categories; and a second determining sub-unit, configured to determine, according to the matching degrees between the to-be-analyzed sentence and the sentence categories, the sentence category to which the to-be-analyzed sentence belongs.

In some embodiments, the device may further include:

a hashing unit, configured to input, before each feature in the first feature set and the second feature set is encoded, each first feature into a preset hash function, to obtain a hash value corresponding to the first feature, the hash function being capable of mapping an input feature to an integer in a preset interval, where the encoding sub-unit is specifically configured to encode first features having a same hash value as a feature, to obtain the corresponding first vector.

In some embodiments, the hash function may include:

$$f_1(x_1) = x_1 \bmod n, \text{ where}$$

$x_1$ is an input feature of the hash function, and $f_1(x_1)$ is a hash value and is an integer in $[0, n-1]$.

In some embodiments, the preset quantity is a first preset quantity, and the determining unit may further include:

a conversion sub-unit, configured to input, before the second vector is inputted into the preset classifier, the second vector into a transformation model, the transformation model including a second preset quantity of transformation functions, nonlinear transformation being capable of being performed on input data by using the transformation functions, and in two adjacent transformation functions, output data of a former transformation function being input data of a latter transformation function in a case that the second preset quantity is greater than or equal to 2, where the input sub-unit is specifically configured to input output data of the transformation model into the preset classifier.

In some embodiments, an ith transformation function may be:

$$h_i = f_2(W_i * h_{i-1} + b_i), \text{ where}$$

$f_2(x_2) = 1/(1 + \exp(-x_2))$, $x_2 = W_i * h_{i-1} + b_i$, $W_i$ is a weight coefficient, $b_i$ is a bias coefficient, $h_{i-1}$ is output data of an $(i-1)^{th}$ transformation function, and $h_0$ is the second vector when i is 1.

In some embodiments, the first determining sub-unit is specifically configured to determine an average vector of the first vectors, and use the average vector as the second vector, each element in the average vector being a ratio of a sum of elements at corresponding locations in the first vectors to a quantity of the first vectors.

In some embodiments, the preset classifier may calculate the matching degrees between the to-be-analyzed sentence and the sentence categories by using the following formula:

$$\text{softmax}(y_0, \ldots, y_n) = \left( \frac{y_0}{\sum_{j=0}^{n} y_j}, \ldots, \frac{y_n}{\sum_{j=0}^{n} y_j} \right),$$

where $y_0, \ldots, y_n$ are elements in vectors inputted into the preset classifier.

In some embodiments, the second determining sub-unit is specifically configured to use a sentence category corresponding to a highest matching degree in the matching degrees between the to-be-analyzed sentence and the sentence categories as the sentence category to which the to-be-analyzed sentence belongs.

In the session information processing method or device, the to-be-analyzed sentence may be classified, to learn of the category to which the to-be-analyzed sentence belongs. Based on a classification result, the to-be-analyzed sentence may be further processed. For example, semantic analysis is performed, or an operation is performed based on the semantic analysis. Therefore, an embodiment of this application provides another session information processing method. The method may include the following steps:

S301: Receive a sentence in a session and use the sentence as a to-be-analyzed sentence.

Figure 4:
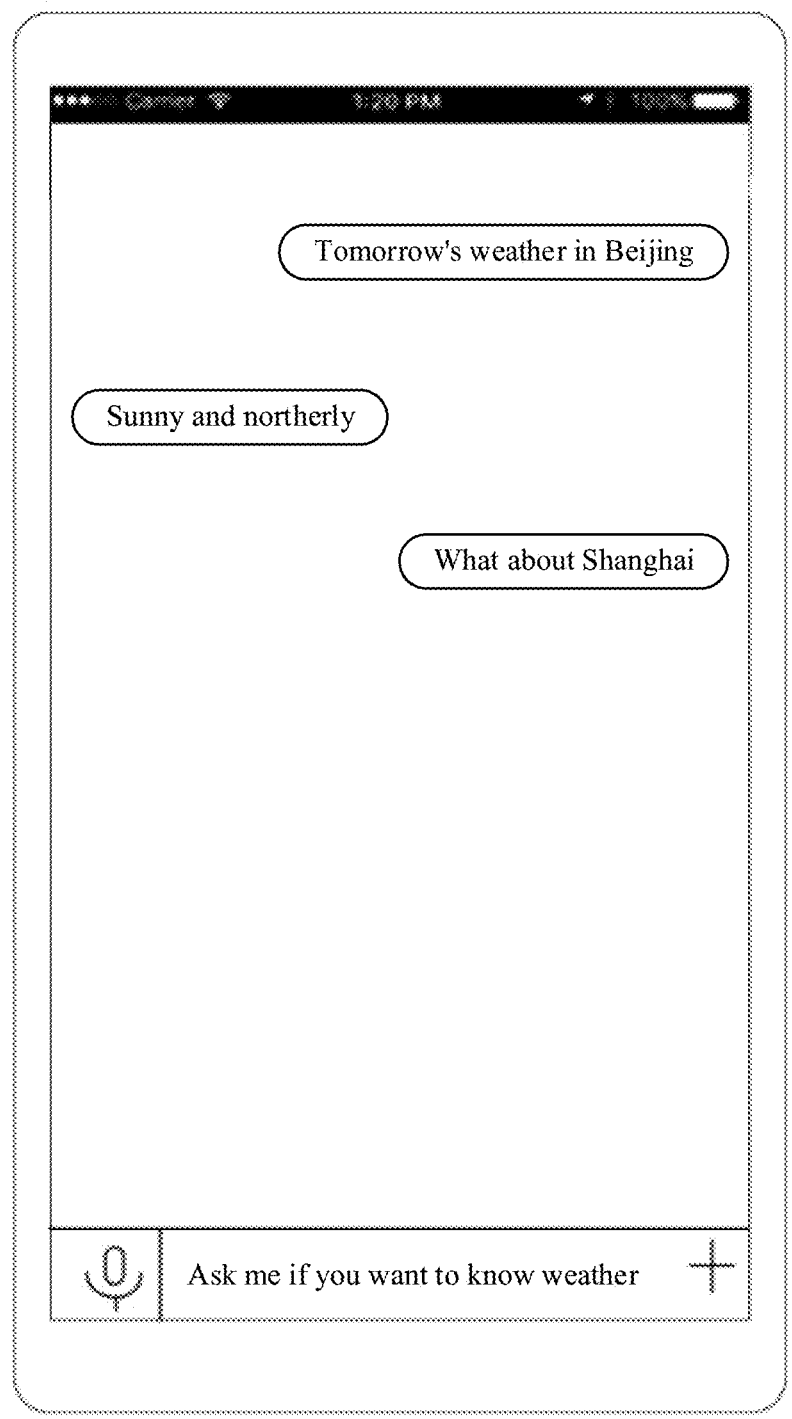
FIG. 4 is a schematic diagram of an interface of a session according to an embodiment of this application.

It may be understood that the sentence may be inputted by a user by using a text or may be obtained by converting voice data inputted by the user, and certainly, may be obtained by using another form. For example, as shown in FIG. 4, when the user queries weather on a client of a mobile phone by using an intelligent tool, the user may manually input "tomorrow's weather in Beijing" or input "tomorrow's weather in Beijing" via voice. Then, the intelligent tool analyzes the sentence and then queries current weather and sends queried weather information "sunny and northerly".

For another example, when the user chats with a robot, the user says "Bodhi is fundamentally without any tree". After receiving the voice, the robot converts the voice into a text sentence and replies "the bright mirror is also not a stand" after analysis.

S302: Determine a category of the to-be-analyzed sentence by using S201 to S204.

S303: Analyze semantics of the to-be-analyzed sentence according to the to-be-analyzed sentence in a case that the to-be-analyzed sentence belongs to the first category, to obtain the semantics of the to-be-analyzed sentence.

If the to-be-analyzed sentence belongs to the first category, it indicates that a sentence of the to-be-analyzed sentence is complete, and semantics is unambiguous. Therefore, the to-be-analyzed sentence is analyzed according to the to-be-analyzed sentence, to learn of the semantics.

For example, in the following dialog:
A1: 白马寺
B1: 很悠久的寺院
A1: 去过白马寺吗

A to-be-analyzed sentence "去过白马寺吗?" belongs to the first category. Semantics may be analyzed directly according to the sentence "去过白马寺吗?".

S304: Analyze the semantics of the to-be-analyzed sentence according to the to-be-analyzed sentence and the preset quantity of preceding sentences in a case that the to-be-analyzed sentence belongs to the second category, to obtain the semantics of the to-be-analyzed sentence.

If the to-be-analyzed sentence belongs to the second category, it indicates that the to-be-analyzed sentence is incomplete or semantics is ambiguous. Therefore, semantic analysis needs to be performed on the to-be-analyzed sentence by combining the preceding sentences.

For example, in the following dialog:
A2: 白马寺
B2: 很悠久的寺院
A2: a 去过吗?

A to-be-analyzed sentence "去过吗?" belongs to the second category. Therefore, a meaning of the to-be-analyzed sentence needs to be analyzed by combining preceding sentences "白马寺" and "很悠久的寺院", to learn that the meaning thereof is "去 过白马寺吗?".

When it is learned that the to-be-analyzed sentence belongs to the second category, the to-be-analyzed sentence may be completed by using a completion technology. The completion means extracting some words or phrases in preceding sentences and adding the words or phrases into the to-be-analyzed sentence, to form a fluent and unambiguous sentence, to compress many rounds of dialogs into a single round of sentence. That is, the to-be-analyzed sentence is completed according to the preceding sentences, to obtain a completed sentence, the completed sentence belonging to the first category, and then semantic analysis may be performed on the completed sentence, to obtain the semantics of the to-be-analyzed sentence.

For example,
User A: Tell me a story;
Robot: I will when I learn how.
User A: I'm waiting.

A purpose of the completion is to rewrite "I'm waiting" as "I'm waiting for the story" by combining preceding sentences. This helps analyze semantics.

Sentence completion may be implemented by using the following manner:

$$q'=F(q|C)$$

C in input is a previous sentence, that is, previous rounds of dialogs, q is a to-be-analyzed sentence, q' is a completed sentence and has complete semantics, F is a constructed mapping model, and the completed sentence may be outputted according to the inputted preceding sentences and the to-be-analyzed sentence.

Construction of the mapping model may be abstracted as a translation question. For the foregoing examples, a plurality of rounds of dialogs may be regarded as a language A with complex expressions, and our purpose is to translate the language A into a language B with concise and compact expressions. Specifically, this may be implemented by using an autoencoder. That is, end-to-end modeling is performed by using an encoder-decoder architecture, and a sentence with complete semantics may be automatically generated according to the preceding sentences and the to-be-analyzed sentence having missing information. In the framework, an encoding part may encode the input by using the LSTM, and a decoding part may generate an outputted sentence by using the RNN. In addition, to enhance impact of related words in the preceding sentences on generating an outputted sentence, an attention mechanism may be used to enhance impact of key parts and weaken impact of irrelevant information.

A specific modeling process may include: splicing the inputted preceding sentences and the inputted to-be-analyzed sentence together, to obtain a spliced sentence. In an encoding process, by using a bi-directional LSTM and using each word as a center, embedding of the whole spliced sentence is extracted. Then, an attention weight value is calculated according to hidden layers of the decoder and the embedding in the encoder, a weight sum of the extracted embedding is calculated by using the weight value, to obtain a global vector expression in a current important word, the vector, the hidden layers of the decoder, and a last generated word are inputted into the decoder together, to obtain probability distribution of a word to be generated next in a dictionary, and a word with a largest probability is used as the output. The foregoing process is repeated until a terminator is generated. Therefore, a complete sentence is obtained and outputted.

S305: Perform a corresponding operation according to the semantics of the to-be-analyzed sentence.

Figure 5:
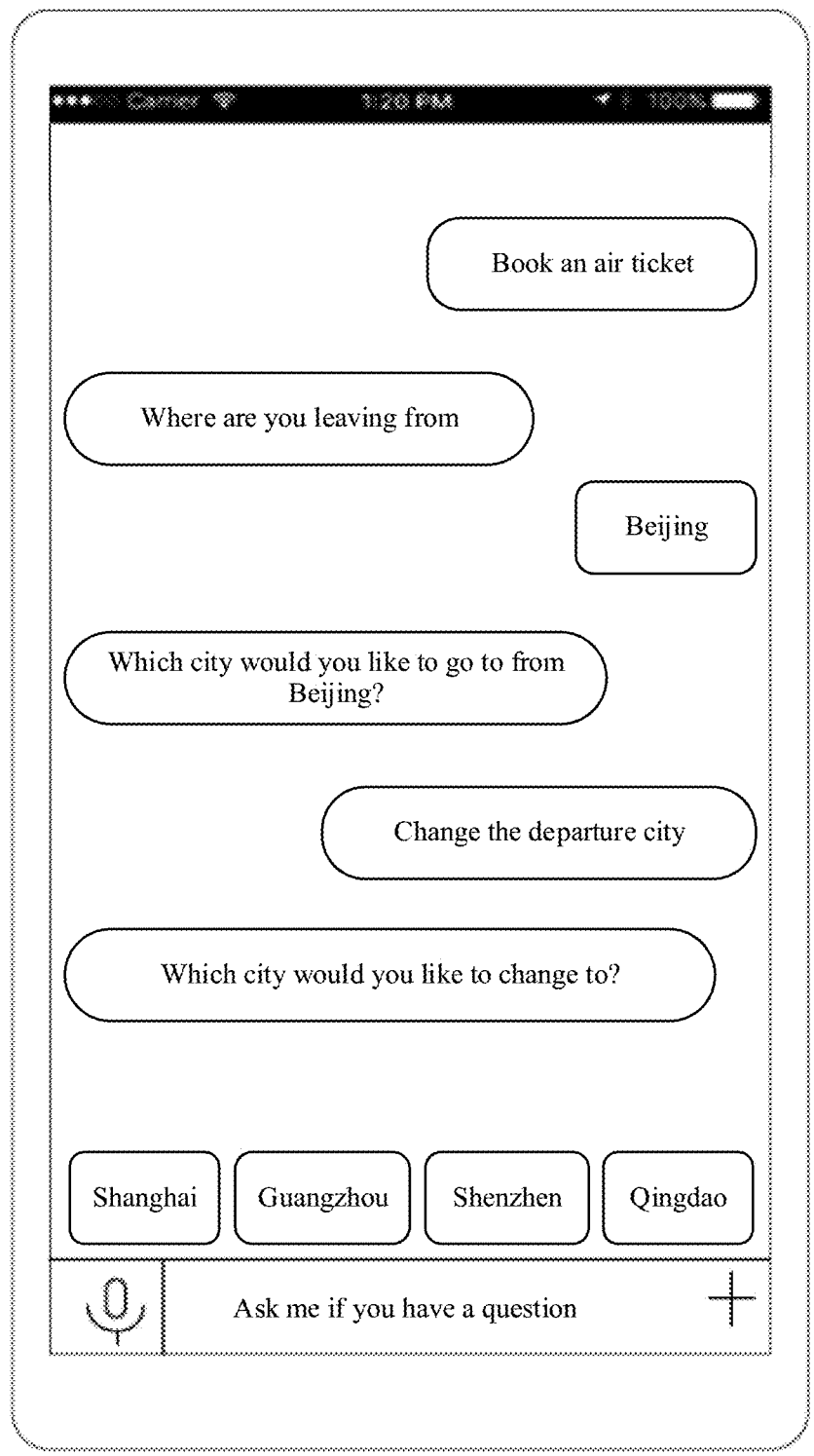
FIG. 5 is a schematic diagram of an interface of a session according to an embodiment of this application.
Figure 6:
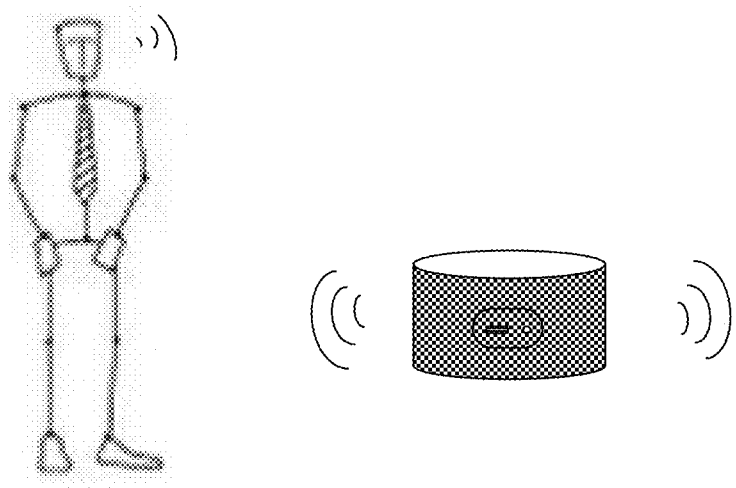
FIG. 6 is a diagram of a use scenario of a smart speaker according to an embodiment of this application.

For example, as shown in FIG. 5, the user enters "book an air ticket" on an intelligent customer service of a client. A dialog that the user places an order through the intelligent customer service and the like is actually a task-type dialog that needs to be accurately controlled. This type of dialog may be managed by using a slot system. That is, a dialog and a procedure may be configured through the slot system. It is preset that information that needs to be filled is used as a slot, and for a slot with missing information, a question needs to be asked to the user to obtain corresponding information. That is, the intelligent customer service sets a corresponding slot by using a slot system and according to the semantics of the to-be-analyzed sentence, replies the user with an information obtaining sentence for the to-be-analyzed sentence, to obtain information needed by the slot, and performs the corresponding operation according to the information needed by the slot. In this example, the user enters "book an air ticket" on an intelligent customer service. A departure city, a destination, departure time, ticket booker information, and the like are needed to book an air ticket, and a related slot is configured through the slot system. For each slot with missing information, a question is asked to the user. Therefore, the intelligent customer service replies "Where are you leaving from", then the user enters "Beijing", then the intelligent customer service replies "Which city would you like to go to from Beijing?", and the rest is deduced by analogy. Needed information is obtained from answers of the user through continuous question asking, and the information is filled in corresponding slots, and a ticket booking operation may be performed after complete information is obtained. Certainly, information in slots with filled information may also be changed. For example, after the intelligent customer service replies "Which city would you like to go to from Beijing?", the user enters "Change the departure city", after receiving the sentence, a server of the intelligent customer determines that a category thereof is the second category, needs to understand the sentence by combining preceding sentences, and learns that semantics thereof is: changing the departure city of the air ticket, to perform the following operation: replying the user with "Which city would you like to change to?" and providing several possible changed cities below an input box: Shanghai, Guangzhou, Shenzhen, and Qingdao. After the user enters the changed city, the intelligent customer service performs information replacement on the corresponding slot, to modify the information. Therefore, In the previous example, the performed corresponding operation is replying a sentence. Certainly, the performed corresponding operation is not limited to replying a sentence and may alternatively be playing a song, querying news information, placing an order, or the like. For example, as shown in FIG. 6, if the user issues voice "play the song "New Endless Love"", after receiving the voice, a smart speaker plays the song, and a specific implementation process is roughly: the smart speaker is connected to a background server through a communications network, after receiving voice, the smart speaker sends the voice to the background server, then the background server converts the voice into a text sentence and analyzes the text sentence to obtain semantics thereof, and then the server performs the following operation: querying "New Endless Love" in a song library, and sending an audio flow to the smart speaker, so that the smart speaker plays the song.

Figure 7:
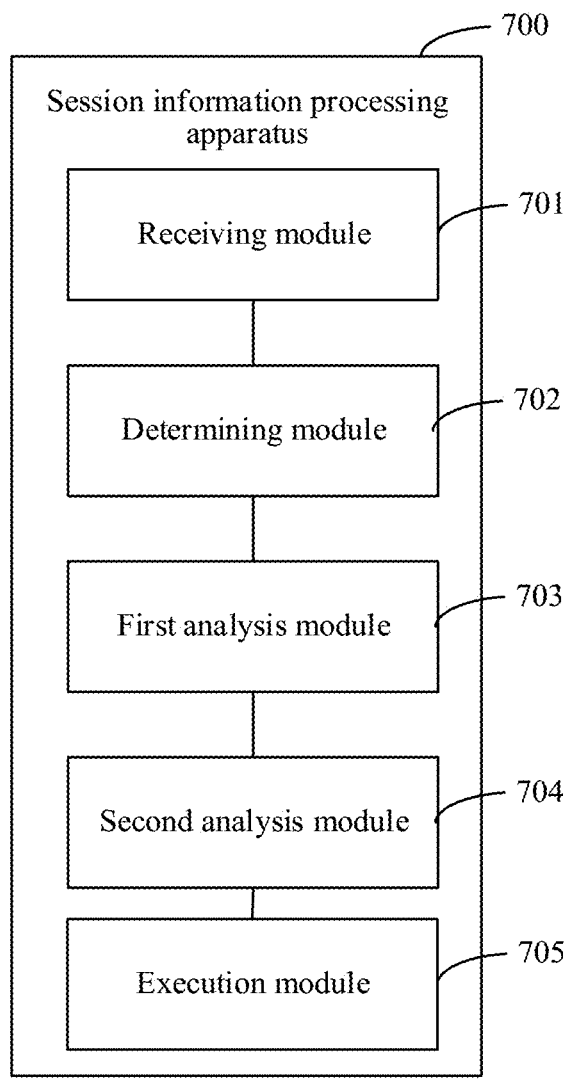
FIG. 7 is a structural block diagram of a session information processing device according to an embodiment of this application.

Corresponding to the session information processing method, an embodiment of this application further provides a session information processing device. As shown in FIG. 7, the device 700 includes:
one or more memories; and
one or more processors,
the one or more memories storing one or more instruction modules, configured to be executed by the one or more processors; and the one or more instruction modules including:
a receiving module 701, configured to receive a sentence in a session and use the sentence as a to-be-analyzed sentence;
a determining module 702, including the one or more instruction units in the device 300 and configured to determine a category of the to-be-analyzed sentence;
a first analysis module 703, configured to analyze semantics of the to-be-analyzed sentence according to the to-be-analyzed sentence in a case that the to-be-analyzed sentence belongs to the first category, to obtain the semantics of the to-be-analyzed sentence;
a second analysis module 704, configured to analyze the semantics of the to-be-analyzed sentence according to the to-be-analyzed sentence and the preset quantity of preceding sentences in a case that the to-be-analyzed sentence belongs to the second category, to obtain the semantics of the to-be-analyzed sentence; and an execution module 705, configured to perform a corresponding operation according to the semantics of the to-be-analyzed sentence.

It may be understood that the foregoing units are functional modules of the foregoing session information processing method S301 to S305. For explanations, examples, beneficial effects, and the like of related content thereof, refer to corresponding parts in the foregoing session information processing method. Details are not provided herein again.

The embodiments of the present invention further provide a non-volatile computer-readable storage medium, storing a computer program, when being executed by a processor, the program implementing the steps (such as S201 to S204 or S301 to S305) according to any one of the foregoing methods.

Figure 8:
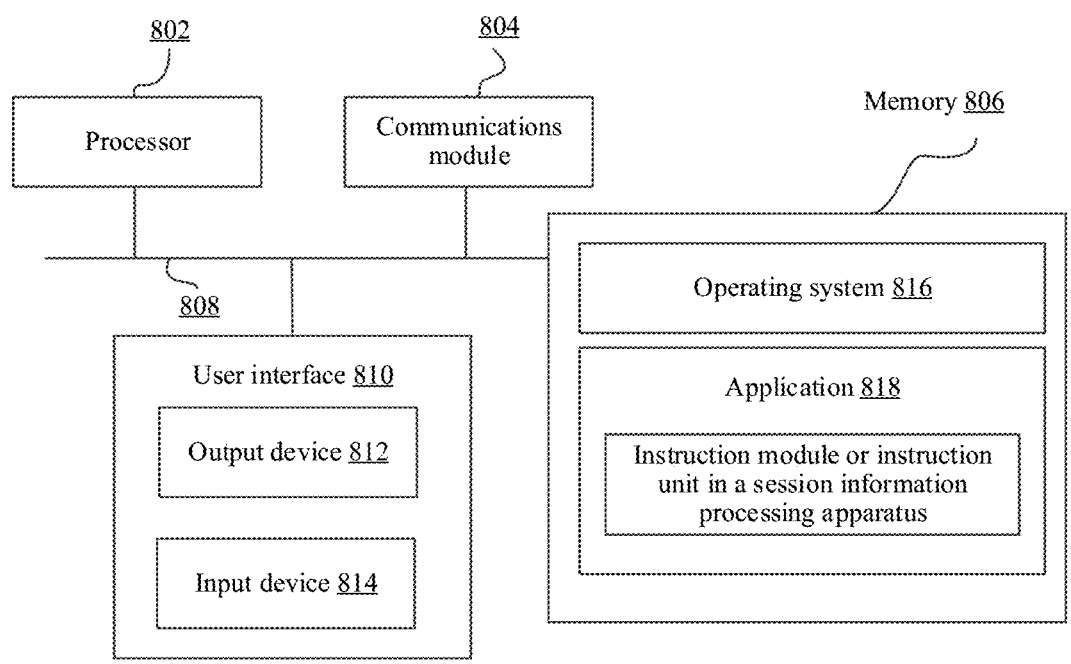
FIG. 8 is a structural block diagram of a computer device according to an embodiment of this application.

An embodiment of this application further provides a computer device. The computer device may be the foregoing electronic device. As shown in FIG. 8, the computer device includes one or more processors (CPU) 802, a communications module 804, a memory 806, a user interface 810, and a communications bus 808 for interconnecting these components.

The processor 802 may implement network communication and/or local communication by receiving and sending data by the communications module 804.

The user interface 810 includes one or more output devices 812, including one or more speakers and/or one or more visualization displays. The user interface 810 further includes one or more input devices 814, including a keyboard, a mouse, a sound command input unit or a microphone, a touch display, a touch-sensitive input panel, a posture capturing camera, another input key or control, or the like.

The memory 806 may be a high-speed random access memory such as a DRAM, an SRAM, a DDR RAM, or other random access solid-state memory devices; or a non-volatile memory such as one or more magnetic disk storage devices, optical disc storage devices, flash memory devices, or other non-volatile solid-state memory devices.

The memory 806 stores an instruction set that can be executed by the processor 802 and includes:
an operating system 816, including a program used for processing various basic system services and for executing hardware-related tasks; and
an application 818, including various application programs used for session information processing, where the application programs can implement the processing procedures of the foregoing embodiments, for example, may include some or all of the instruction modules or units in the session information processing device; and the processor 802 executes a machine-executable instruction of at least one of the units in the memory 806, to implement a function of at least one module in the foregoing units or modules.

It should be noted that not all steps and modules in the procedures and the structural diagrams are necessary, and some steps or modules may be omitted according to an actual need. An execution sequence of the steps is not fixed and may be adjusted as needed. Division of the modules is merely functional division for ease of descriptions. During actual implementation, one module may include a plurality of modules, and functions of a plurality of modules may be implemented by a same module. These modules may be located in a same device or in different devices.

The hardware modules in the embodiments may be implemented in a hardware manner or by using a hardware platform plus software. The software includes machine-readable instructions, stored in a non-volatile storage medium. Therefore, each embodiment may be implemented in a form of a software product.

In the embodiments, the hardware may be implemented by dedicated hardware or hardware executing the machine-readable instructions. For example, the hardware may be a permanent circuit or logical device (for example, a special-purpose processor, such as an FPGA or an ASIC) that is specially designed to perform particular operations. Alternatively, the hardware may include a programmable logic device or circuit (for example, including a general-purpose processor or another programmable processor) that is temporarily configured by software to perform particular operations.

In addition, each embodiment of this application may be implemented by a data processing program executed by a data processing device such as a computer. Apparently, the data processing program constitutes this application. In addition, generally, a data processing program stored in a storage medium is directly read from the storage medium for execution or the program is installed on or replicated to a storage device (such as a hard disk or memory) of a data processing device for execution. Therefore, such storage medium also constitutes this application. This application further provides a non-volatile storage medium storing a data processing program. The data processing program may be used for performing any one of the foregoing embodiments of this application.

The machine-readable instructions corresponding to the modules in FIG. 8 can enable the operating system and the like running on the computer to complete some or all operations described herein. A non-volatile computer-readable storage medium may be a memory disposed in an extension board inserted into the computer or a memory disposed in an extension unit connected to the computer. A CPU and the like installed on the extension board or the extension unit can perform some or all actual operations according to the instructions.

The foregoing descriptions are merely preferred embodiments of this application, but are not intended to limit this application. Any modification, equivalent replacement, or improvement made within the spirit and principle of this application shall fall within the protection scope of this application.

What is claimed is:

1. A session information processing method performed at a computing device having one or more processors and memory storing programs to be executed by the one or more processors, the method comprising:

extracting a to-be-analyzed sentence and a preset quantity of preceding sentences of the to-be-analyzed sentence from a session;

performing word segmentation on the to-be-analyzed sentence and the preset quantity of preceding sentences, to obtain a first feature set comprising a plurality of first features;

extracting a second feature set comprising one or more second features from a first word set corresponding to the to-be-analyzed sentence and a second word set corresponding to the preset quantity of preceding sentences, one second feature comprising a phrase or sentence comprising a first word and a second word, the first word being one or more words in the first word set, and the second word being one or more words in the second word set; and determining, according to the first feature set and the second feature set, a sentence category to which the to-be-analyzed sentence belongs, the sentence category comprising a first category indicating that a sentence is complete, and semantics is unambiguous and a second category indicating that a sentences is incomplete, or semantics is ambiguous.

2. The method according to claim 1, wherein the performing word segmentation on the to-be-analyzed sentence and the preset quantity of preceding sentences comprises:

splicing the to-be-analyzed sentence and the preset quantity of preceding sentences according to a sentence sequence in the session, to obtain a spliced sentence, adjacent preceding sentences being separated by using a first character, and the to-be-analyzed sentence and a previous sentence adjacent to the to-be-analyzed sentence being separated by using a second character; and extracting an N-gram feature from the spliced sentence and using the N-gram feature as the first feature to form the first feature set, N being a preset integer.

3. The method according to claim 1, wherein the determining, according to the first feature set and the second feature set, a sentence category to which the to-be-analyzed sentence belongs comprises:

encoding each feature in the first feature set and the second feature set, to obtain a first vector corresponding to the feature, a quantity of elements in each first vector being the same;

determining a second vector according to the first vectors, the second vector being a vector representing the to-be-analyzed sentence and the preset quantity of preceding sentences;

inputting the second vector into a preset classifier, to obtain matching degrees between the to-be-analyzed sentence and sentence categories; and determining, according to the matching degrees between the to-be-analyzed sentence and the sentence categories, the sentence category to which the to-be-analyzed sentence belongs.

4. The method according to claim 3, wherein before the encoding each feature in the first feature set and the second feature set, the method further comprises:

inputting each first feature into a preset hash function, to obtain a hash value corresponding to the first feature, the hash function being capable of mapping an input feature to an integer in a preset interval; and the encoding each feature in the first feature set and the second feature set, to obtain a first vector of a preset dimension corresponding to the feature comprises:

encoding first features having a same hash value as a feature, to obtain the corresponding first vector.

5. The method according to claim 4, wherein the hash function comprises:

$f_1(x_1) = x_1 \bmod n$, wherein x1 is an input feature of the hash function, and f1(x1) is a hash value and is an integer in [0, n−1].

6. The method according to claim 3, wherein the preset quantity is a first preset quantity, and before the inputting the second vector into a preset classifier, the method further comprises:

inputting the second vector into a transformation model, the transformation model comprising a second preset quantity of transformation functions, nonlinear transformation being capable of being performed on input data by using the transformation functions, and in two adjacent transformation functions, output data of a former transformation function being input data of a latter transformation function in a case that the second preset quantity is greater than or equal to 2; and the inputting the second vector into a preset classifier comprises:

inputting output data of the transformation model into the preset classifier.

7. The method according to claim 6, wherein an ith transformation function is:

$$h_i = f_2(W_i * h_{i-1} + b_i), \text{ wherein}$$

$f_2(x2)=1/(1+\exp(-x2))$, $x2=W_i * h_{i-1}+b_i$, Wi is a weight coefficient, bi is a bias coefficient, hi−1 is output data of an (i−1)th transformation function, and h0 is the second vector when i is 1.

8. The method according to claim 3, wherein the determining a second vector according to the first vectors comprises:

determining an average vector of the first vectors, and using the average vector as the second vector, each element in the average vector being a ratio of a sum of elements at corresponding locations in the first vectors to a quantity of the first vectors.

9. The method according to claim 3, wherein the preset classifier calculates the matching degrees between the to-be-analyzed sentence and the sentence categories by using the following formula:

$$\text{softmax}(y_0, \ldots, y_n) = \left( \frac{y_0}{\sum_{j=0}^{n} y_j}, \ldots, \frac{y_n}{\sum_{j=0}^{n} y_j} \right),$$

wherein $y_0, \ldots, y_n$ are elements in vectors inputted into the preset classifier.

10. The method according to claim 3, wherein the determining, according to the matching degrees between the to-be-analyzed sentence and the sentence categories, the sentence category to which the to-be-analyzed sentence belongs comprises:

using a sentence category corresponding to a highest matching degree in the matching degrees between the to-be-analyzed sentence and the sentence categories as the sentence category to which the to-be-analyzed sentence belongs.

11. A computing device comprising one or more processors, memory coupled to the one or more processors and a plurality of programs stored in the memory that, when executed by the one or more processors, cause the computing device to perform a plurality of operations comprising:

extracting a to-be-analyzed sentence and a preset quantity of preceding sentences of the to-be-analyzed sentence from a session;

performing word segmentation on the to-be-analyzed sentence and the preset quantity of preceding sentences, to obtain a first feature set comprising a plurality of first features;

extracting a second feature set comprising one or more second features from a first word set corresponding to the to-be-analyzed sentence and a second word set corresponding to the preset quantity of preceding sentences, one second feature comprising a phrase or sentence comprising a first word and a second word, the first word being one or more words in the first word set, and the second word being one or more words in the second word set; and determining, according to the first feature set and the second feature set, a sentence category to which the to-be-analyzed sentence belongs, the sentence category comprising a first category indicating that a sentence is complete, and semantics is unambiguous and a second category indicating that a sentences is incomplete, or semantics is ambiguous.

12. The computing device according to claim 11, wherein the performing word segmentation on the to-be-analyzed sentence and the preset quantity of preceding sentences comprises:

splicing the to-be-analyzed sentence and the preset quantity of preceding sentences according to a sentence sequence in the session, to obtain a spliced sentence, adjacent preceding sentences being separated by using a first character, and the to-be-analyzed sentence and a previous sentence adjacent to the to-be-analyzed sentence being separated by using a second character; and extracting an N-gram feature from the spliced sentence and using the N-gram feature as the first feature to form the first feature set, N being a preset integer.

13. The computing device according to claim 11, wherein the determining, according to the first feature set and the second feature set, a sentence category to which the to-be-analyzed sentence belongs comprises:

encoding each feature in the first feature set and the second feature set, to obtain a first vector corresponding to the feature, a quantity of elements in each first vector being the same;

determining a second vector according to the first vectors, the second vector being a vector representing the to-be-analyzed sentence and the preset quantity of preceding sentences;

inputting the second vector into a preset classifier, to obtain matching degrees between the to-be-analyzed sentence and sentence categories; and determining, according to the matching degrees between the to-be-analyzed sentence and the sentence categories, the sentence category to which the to-be-analyzed sentence belongs.

14. The computing device according to claim 13, wherein before the encoding each feature in the first feature set and the second feature set, the method further comprises:

inputting each first feature into a preset hash function, to obtain a hash value corresponding to the first feature, the hash function being capable of mapping an input feature to an integer in a preset interval; and the encoding each feature in the first feature set and the second feature set, to obtain a first vector of a preset dimension corresponding to the feature comprises:

encoding first features having a same hash value as a feature, to obtain the corresponding first vector.

15. The computing device according to claim 13, wherein the preset quantity is a first preset quantity, and before the inputting the second vector into a preset classifier, the method further comprises:

inputting the second vector into a transformation model, the transformation model comprising a second preset quantity of transformation functions, nonlinear transformation being capable of being performed on input data by using the transformation functions, and in two adjacent transformation functions, output data of a former transformation function being input data of a latter transformation function in a case that the second preset quantity is greater than or equal to 2; and the inputting the second vector into a preset classifier comprises:
inputting output data of the transformation model into the preset classifier.

16. The computing device according to claim 13, wherein the determining a second vector according to the first vectors comprises:
determining an average vector of the first vectors, and using the average vector as the second vector, each element in the average vector being a ratio of a sum of elements at corresponding locations in the first vectors to a quantity of the first vectors.

17. The computing device according to claim 13, wherein the preset classifier calculates the matching degrees between the to-be-analyzed sentence and the sentence categories by using the following formula:

$$\mathit{softmax}(y_0, \ldots, y_n) = \left( \frac{y_0}{\sum_{j=0}^{n} y_j}, \ldots, \frac{y_n}{\sum_{j=0}^{n} y_j} \right),$$

wherein
$y_0, \ldots, y_n$ are elements in vectors inputted into the preset classifier.

18. The computing device according to claim 13, wherein the determining, according to the matching degrees between the to-be-analyzed sentence and the sentence categories, the sentence category to which the to-be-analyzed sentence belongs comprises:
using a sentence category corresponding to a highest matching degree in the matching degrees between the to-be-analyzed sentence and the sentence categories as the sentence category to which the to-be-analyzed sentence belongs.

19. A non-transitory computer readable storage medium storing a plurality of machine readable instructions in connection with a computing device having one or more processors, wherein the plurality of machine readable instructions, when executed by the one or more processors, cause the computing device to perform a plurality of operations including:
extracting a to-be-analyzed sentence and a preset quantity of preceding sentences of the to-be-analyzed sentence from a session;
performing word segmentation on the to-be-analyzed sentence and the preset quantity of preceding sentences, to obtain a first feature set comprising a plurality of first features;
extracting a second feature set comprising one or more second features from a first word set corresponding to the to-be-analyzed sentence and a second word set corresponding to the preset quantity of preceding sentences, one second feature comprising a phrase or sentence comprising a first word and a second word, the first word being one or more words in the first word set, and the second word being one or more words in the second word set; and
determining, according to the first feature set and the second feature set, a sentence category to which the to-be-analyzed sentence belongs, the sentence category comprising a first category indicating that a sentence is complete, and semantics is unambiguous and a second category indicating that a sentences is incomplete, or semantics is ambiguous.

20. The non-transitory computer readable storage medium according to claim 19, wherein the performing word segmentation on the to-be-analyzed sentence and the preset quantity of preceding sentences comprises:
splicing the to-be-analyzed sentence and the preset quantity of preceding sentences according to a sentence sequence in the session, to obtain a spliced sentence, adjacent preceding sentences being separated by using a first character, and the to-be-analyzed sentence and a previous sentence adjacent to the to-be-analyzed sentence being separated by using a second character; and
extracting an N-gram feature from the spliced sentence and using the N-gram feature as the first feature to form the first feature set, N being a preset integer.

* * * * *